(No Model.)
J. H. DORGAN.
ALE AND BEER FAUCET.
No. 262,021. Patented Aug. 1, 1882.
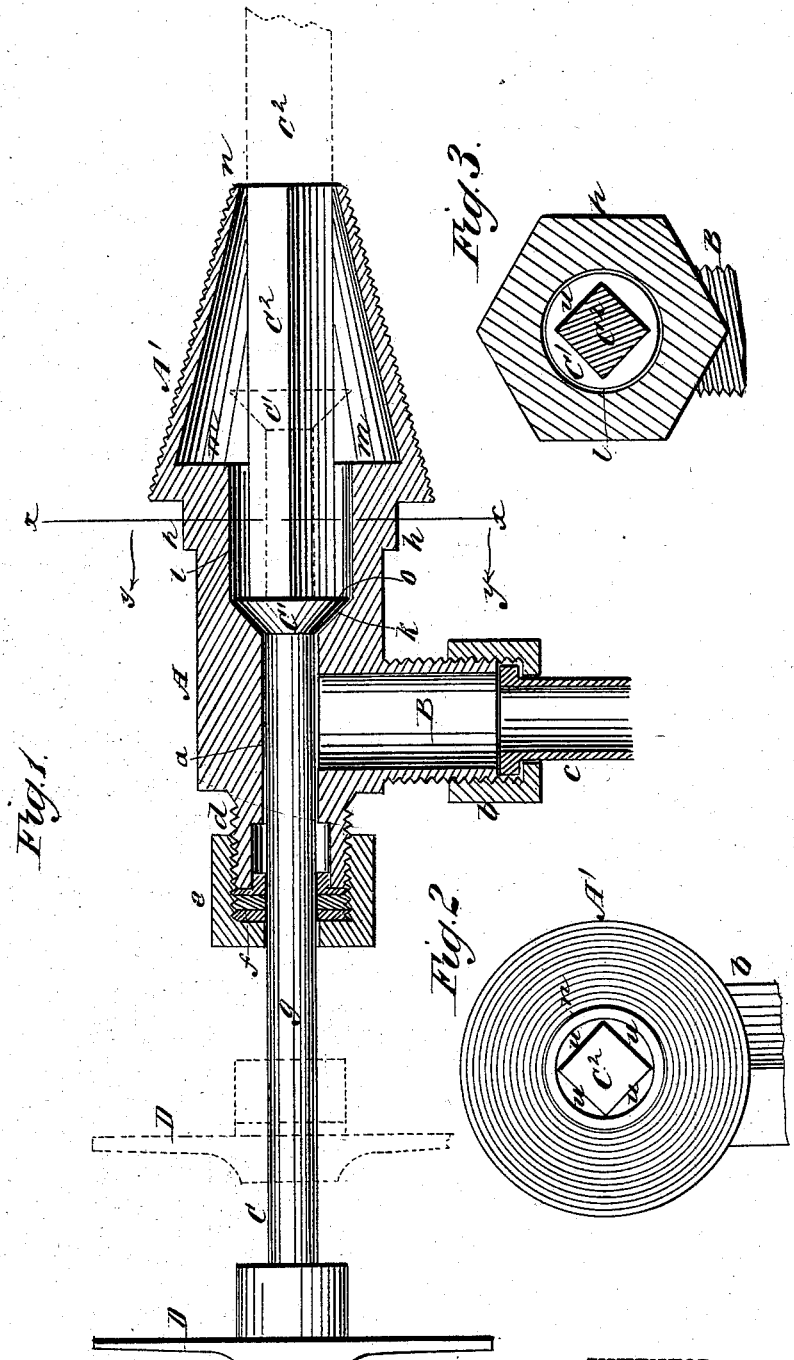

UNITED STATES PATENT OFFICE.

JOSEPH H. DORGAN, OF PLATTSBURG, NEW YORK.

ALE AND BEER FAUCET.

SPECIFICATION forming part of Letters Patent No. 262,021, dated August 1, 1882.

Application filed January 7, 1882. (No model.)

*To all whom it may concern:*

Be it known that I, JOSEPH HENRY DORGAN, of Plattsburg, in the county of Clinton and State of New York, have invented a new and useful Improvement in Ale and Beer Faucets, of which the following is a full, clear, and exact description.

Reference is to be had to the accompanying drawings, forming part of this specification, in which similar letters of reference indicate corresponding parts in all the figures.

Figure 1 is a longitudinal sectional elevation of an ale and beer faucet constructed in accordance with my invention. Fig. 2 is an inner end view of the same; and Fig. 3, a transverse section thereof on the line $x$ $x$, looking in direction of the arrows $y$ $y$ in Fig. 1.

This invention is more particularly designed as an improvement in faucets for drawing ale and beer from casks or barrels; but it is also applicable to faucets for running off other liquids. It will here, however, be described as an improvement in ale and beer faucets; and it consists in a novel construction and in certain combinations of parts, whereby the ale or beer is so interrupted and agitated in its passage through the faucet as to produce an increased amount of froth or foam on the liquid; also, whereby increased facility is afforded for entering the faucet in the cask or barrel, and it is readily adaptable to plug-holes of different sizes in casks or barrels.

A is the body of the faucet, having a side branch, B, on the exterior of which is cut a screw-thread for the reception of a screw-cap, $b$, that serves to unite the delivery or conduit pipe $c$ with the branch B, which is the outlet for the liquid from the body A.

The outer end of the body A is constructed to form a stuffing-box, $d$, through which and through a screw-cap, $e$, fitting on said box and bearing on packing $f$, applied thereto, the cylindrical portion $g$ of a rod, C, moves longitudinally with a fluid-tight fit. The inner end of the body A is constructed to form a nut, $h$, to accommodate a wrench for entering the faucet in the plug-hole of a barrel, and terminates beyond the nut in an enlarged hollow cone, A', having a screw-thread on its exterior for screwing the faucet into the plug-hole. Said cone A' is of suitable transverse size, length, and taper to provide for adapting the faucet to plug-holes of different sizes.

The interior of the body A is but slightly larger transversely than the portion $g$ of the rod C from the inner end of the stuffing-box $d$ to a distance somewhat beyond the aperture of the outlet B, after which it is enlarged and reamed out to form a conical valve-seat, $k$, and beyond this, to its junction with the interior of the hollow cone A', is of uniform enlarged size or diameter, as shown at $l$, but smaller than the interior diameter of the larger end of the cone, which it joins, so as to leave a shoulder, $m$, in the cone outside of and around the passage $l$.

The cylindrical portion $g$ of the rod C is constructed at its inner end to form a valve, C', which fits the valve-seat $k$, and beyond this and extending to the mouth $n$ of the cone A', or thereabout, when the valve is closed, the rod C is projected to form an extension, $C^2$, which is of square or angular form in its transverse section, and so that its angular dimensions correspond, or nearly so, with the diameter of the valve C' at its back end, and with the opening at the mouth $n$ of the cone.

On the outer end of the rod C is screwed a handle, D, by which the faucet is operated.

To open the faucet the rod C is forced inward, which opens the valve C', as shown by dotted lines in Fig. 1, and to close it said rod is drawn outward to the position represented for it and the valve C' by full lines in the same figure, and may also be turned to make the valve sit close.

When the faucet is open and the ale or beer enters the faucet from the barrel said liquid in its passage through the faucet to the conduit-pipe $c$ is interrupted and strikes successively the shoulder $m$ on the inside of the cone, the shoulder $o$, formed by the junction of the angular extension $C^2$ of the rod C with the back of the valve C', and the shoulder formed by the valve-seat $k$. This interruption and agitation cause the ale or beer to froth or foam in its passage from the barrel to the measure or glass which receives it.

The square or angular construction of the extension $C^2$ of the rod C leaves a passage or passages, $u$, at the mouth $n$ of the cone, and in the chamber or passage $l$, for the flow of the ale or beer through the faucet when the valve C' is open, and the mouth n of the cone may serve as a guide for the angular edges of the extension C² at one end of the faucet, while the screw-caps e of the stuffing-box d act as a guide to the rod C at the opposite end of the faucet, thus steadying and keeping the rod C in line, and the valve C' in proper position relatively to its seat k.

The rod C performs a double function—that is to say, it not only serves to open and close the valve C', but answers by its extension C² to drive the plug into the barrel after the faucet has been connected with the barrel by screwing its cone part A' into the tap or plug hole of the barrel.

To apply the faucet to the barrel the plug with which the tap-hole is closed is first sufficiently driven into the barrel, without letting the ale or beer escape, to allow of the faucet being screwed tight within the plug-hole, and the conduit-pipe c is attached to the faucet. The plug is then driven wholly out of the head of the barrel by a blow of the hand or of a mallet on the handle D of the rod C, which causes the extension C² to become a driver of the plug. When it is required to stop or shut off the liquid the rod C is pulled outward, which closes the valve C', after which the conduit-pipe c may be detached, and the faucet be unscrewed from the barrel and be readily inserted, when required, in another barrel.

Having thus described my invention, what I claim as new, and desire to secure by Letters Patent, is—

1. In a faucet, the combination, with the valve-rod C, provided with the valve C' and the cylindrical portion g, of the body A, provided with the different-sized apertures or chambers a l, the valve-seat k, and the hollow cone A', provided with the shoulder m, substantially as and for the purpose set forth.

2. In a faucet, the combination, with the body A, provided with the different-sized apertures a l, the valve-seat k, and the cone A', provided with the shoulder m, of the valve-rod C, provided with the valve C', the cylindrical portion g, and the square extension C², of about the size of the outer end of the cone, substantially as and for the purpose set forth.

3. The body of the faucet, having an attached and enlarged hollow cone at its forward or inner end, constructed to form a shoulder, m, outside of and around the valve-chamber of the faucet, in combination with the valve C', the valve-seat k, forming a shoulder, as described, and the extension C² of the rod C, forming a shoulder or shoulders on the back of the valve, whereby the liquid passing through the faucet is interrupted and agitated to produce froth or foam, as herein set forth.

JOSEPH H. DORGAN.

Witnesses:
PATRICK K. DELANEY,
J. LUCORTHOR,
J. J. FITZPATRICK.